United States Patent

Ragsdale

[15] 3,644,830

[45] Feb. 22, 1972

[54] DATA MODEM HAVING PHASE, FREQUENCY AND AMPLITUDE DISTORTION COMPENSATING MEANS

[72] Inventor: Robert Gordon Ragsdale, Hollywood, Fla.

[73] Assignee: Milgo Electronic Corporation, Miami, Fla.

[22] Filed: Nov. 18, 1969

[21] Appl. No.: 877,813

[52] U.S. Cl. ....................325/42, 325/65, 333/15, 333/18

[51] Int. Cl. ....................H04b 1/12

[58] Field of Search ....................179/15 P, 170.4; 325/42, 49, 325/65, 138, 329, 378, 407, 409, 472; 333/15, 16, 17, 18; 328/162, 166; 329/122, 133, 178

[56] References Cited

UNITED STATES PATENTS

| | | | |
|---|---|---|---|
| 3,283,063 | 11/1966 | Kawashima et al. | 325/65 |
| 3,305,798 | 2/1967 | Rappeport | 333/18 |

*Primary Examiner*—Robert L. Griffin
*Assistant Examiner*—Albert J. Mayer
*Attorney*—Jackson and Jones

[57] ABSTRACT

A high-speed data modem utilizing a two-level, two-polarity data format is disclosed. Digital data is grouped into bit pairs, one bit of each pair is assigned one of two polarities and the other bit is assigned one of two amplitude levels. The bit pairs are modulated with a pair of pilot tones for transmission over a telephone line utilizing a 2,400-cycle-per-second bandwidth.

DC noise factors introduced by the telephone line and circuitry are compensated for by deriving from the received signal DC noise associated with frequency and phase variations between the transmitted and received pilot tones. The DC noise from these tones is converted into digital signals. The digital signals are applied to add and subtract circuitry of a divider chain such that phase and frequency translation of the derived tones, due to telephone line disturbances, are compensated for by emitting pilot tones from the divider which cancel out the DC noise.

11 Claims, 6 Drawing Figures

INVENTOR.
ROBERT GORDON RAGSDALE
BY Jackson & Jones
ATTORNEYS

INVENTOR.
ROBERT GORDON RAGSDALE
BY Jackson & Jones
ATTORNEYS

INVENTOR.
ROBERT GORDON RAGSDALE
BY
Jackson & Jones
ATTORNEYS.

INVENTOR
ROBERT GORDON RAGSDALE
BY
Jackson + Jones
ATTORNEYS.

INVENTOR.
ROBERT GORDON RAGSDALE
BY Jackson & Jones
ATTORNEYS

DATA MODEM HAVING PHASE, FREQUENCY AND AMPLITUDE DISTORTION COMPENSATING MEANS

BACKGROUND OF THE INVENTION

1. Field of the Invention

Field of this invention relates generally to data transmission and, more particularly, relates to the data modem devices for transmitting and receiving data over telephone lines.

2. Description of the Prior Art

Numerous types of data modems, i.e., data modulator/demodulator units are known in the prior art. Various combinations of amplitude and phase modulation of groups of bits are commonplace in the prior art modems. Typically, the data modems employed for transmission of data over telephone pairs are limited in data-handling capacity to somewhere in the neighborhood of 2,400 to 4,800 bits per second. Various manufacturers have advertised modems which allegedly transmit data over leased telephone lines at data speeds as high as 9,600 bits per second. Invariably, however, these prior art modems suffer from numerous handicaps including extreme operational sensitivity caused by the complex and sophisticated circuitry which they require in efforts to achieve high data-handling capability with acceptable error rates.

There are numerous signal degrading factors involved which have prevented, prior to this invention, the attainment of high data capacity with acceptable error rates over telephone lines. Generally speaking, telephone lines and associated electronics introduce three independent yet interrelated noise disturbances. These noise disturbances are random in nature and are extremely difficult to compensate for. The three noise factors which are of paramount consideration are amplitude distortion, phase variation and frequency translation. Of the three factors, noise due to phase variation and frequency translation are primary in adversely affecting any data format which depends upon amplitude differences to contribute to the data identity. In order for any modem to economically operate at high data capacity and acceptable error rates, such noise factors must be readily compensated for by employment of simple and reliable circuitry. Such compensation has heretofore been unknown in prior art modems.

The present invention compensates for all significant noise factors in a simple yet reliable manner.

SUMMARY OF THE INVENTION

A data modem capable of transmitting high-speed data in the order of 9,600 bits per second is disclosed. The data modem is provided with a transmitter that utilizes a serial to parallel data converter for grouping received bits into bit pairs, one bit of each pair is assigned one amplitude of two possible amplitudes and the other bit is assigned one polarity of two possible polarities. The transmitter includes a balanced modulator for modulating the data pairs. The modulator employs a pilot signal frequency having a predetermined phase angle offset. The phase angle offset may be 90°.

A receiver, which is adapted for connection to a telephone line, is also provided in the modem. The receiver includes an oscillator which has a stable output frequency that is N times the transmitting pilot tone frequency. Connected to the oscillator is a divide-by-N frequency generator which may take the form of a digital divider. The digital divider is provided with an add and subtract circuit which causes the divider output to vary in phase and/or frequency in accordance with the number of add and/or subtract counts supplied to the divider.

Signals received over the line are applied to a balanced demodulator in the receiver. This balanced demodulator is characterized by its ability to emit an output signal which is free of any DC noise, provided that the demodulating tone applied to the demodulator is properly correlated to the pilot tone received over the line. Proper correlation between the two tones herein means that the two tones have the same frequency and phase, except that the demodulation tone does not include the predetermined phase offset which was previously inserted in the pilot tone for transmission over the line.

In order to assure the desired phase and frequency correlation between the line pilot tone and the demodulating tone at the receiver, this invention utilizes a storage device which monitors the output from the demodulator and derives DC error signals that are related to improper correlation between phase and frequency of both tones. Steering logic senses the polarity of the DC noise and stores the sensed polarity as an add or a subtract command. A digital command circuit is connected to the steering logic and responds to the add or subtract commands by adding and/or subtracting count pulses to the divider. A timer control senses the presence and frequency of successive add and/or successive subtract commands and in response emits groups of either high-speed, slow-speed, or ultraslow-speed count pulses to the divider so as to rapidly and reliably achieve proper phase correlation.

DESCRIPTION OF THE PREFERRED EMBODIMENT

The data format employed for the modem of the present invention is a two-amplitude and two-polarity format. The amplitude levels for each polarity are symmetrically distributed about a zero reference. Such a format offers favorable protection from amplitude errors attributable to DC noise. This data format and certain timing principles employed in this invention are depicted in FIG. 1A.

Figure 1:
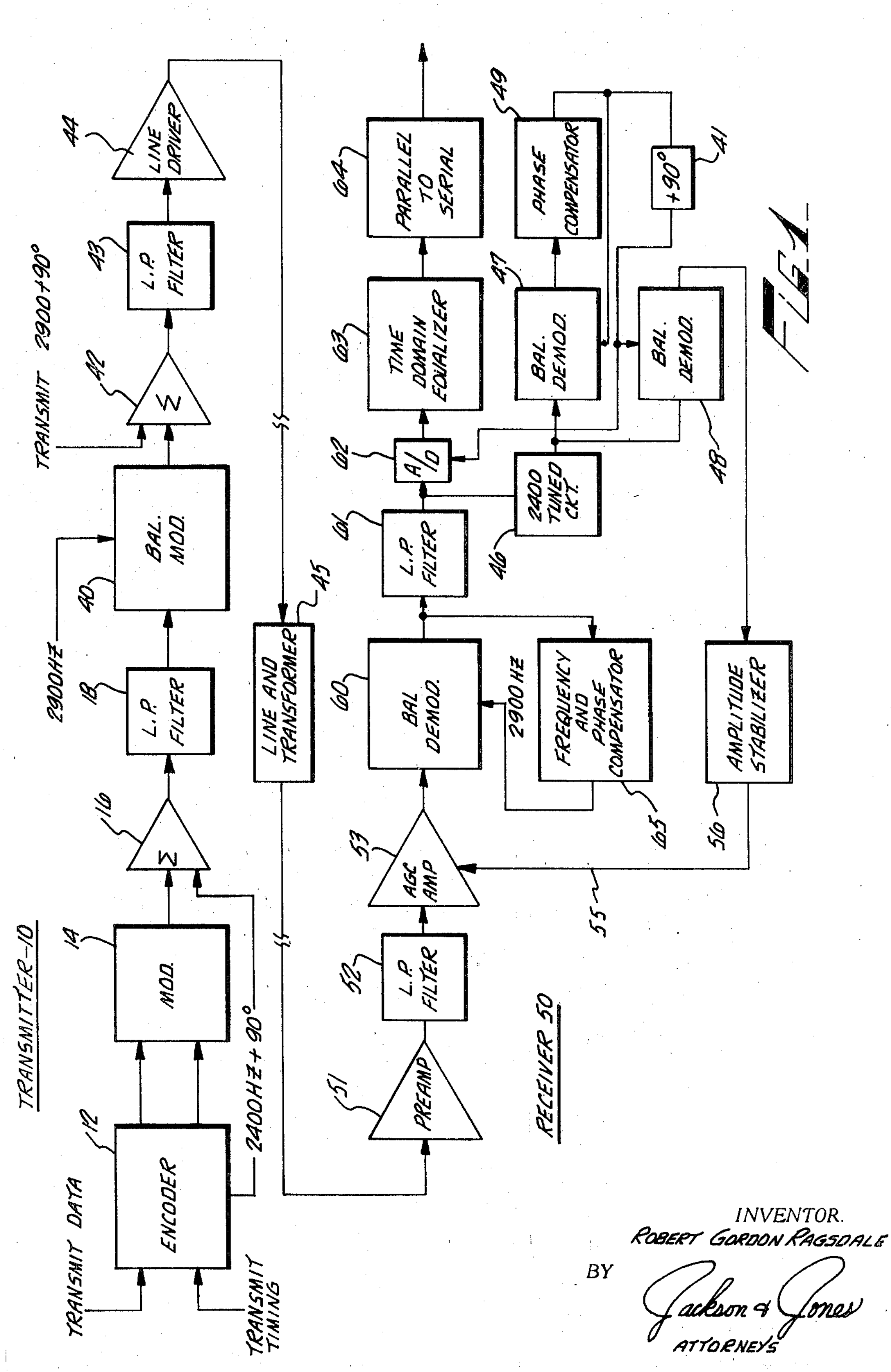
FIG. 1 depicts a transmit and receive portion of a pair of modems connected via telephone line and transformers in accordance with the principles of this invention.
Figure 1A:
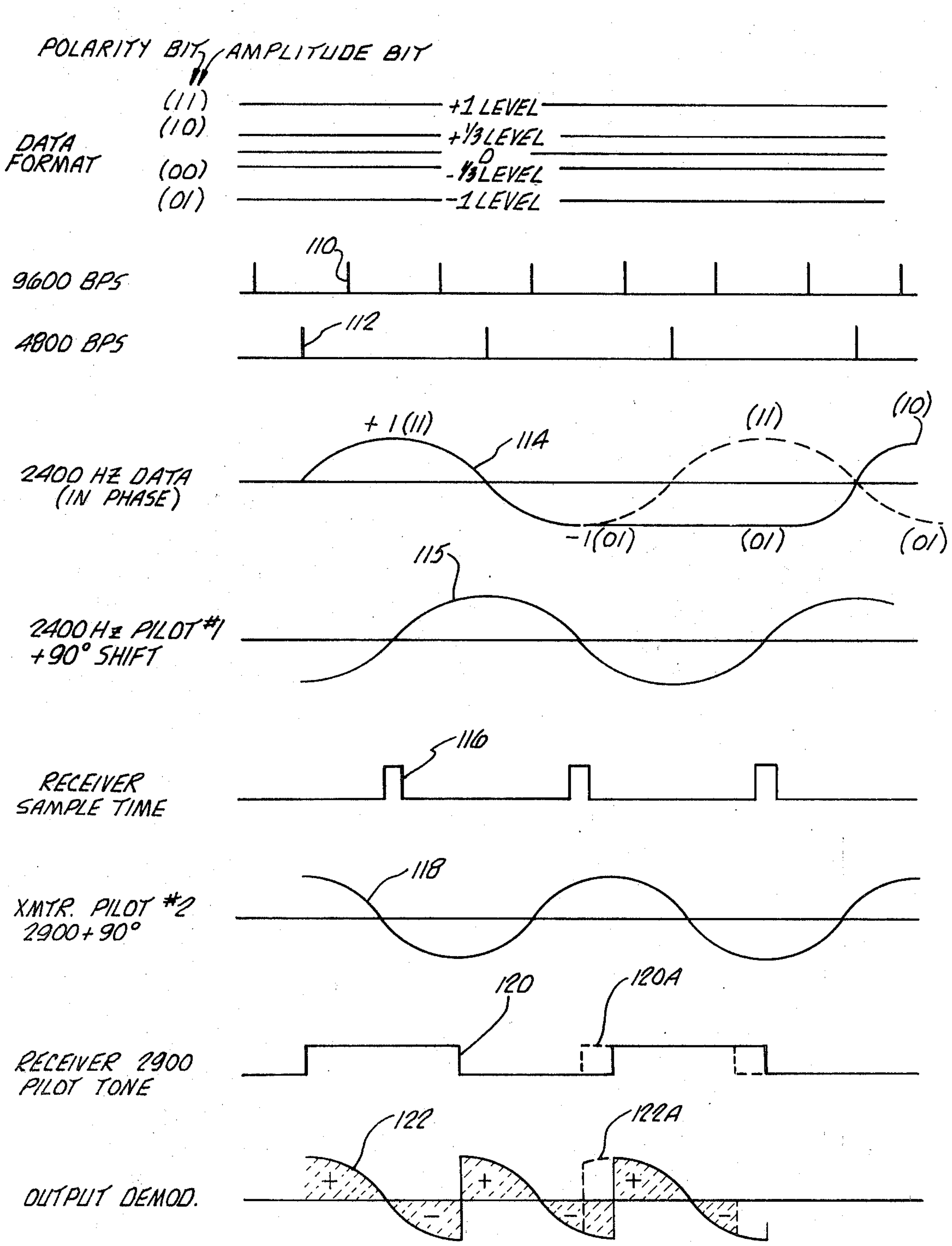
FIG. 1A depicts certain waveforms helpful in promoting a clearer understanding of the modem principles of this invention.

As shown by the data format of FIG. 1A positive polarities have either a +1 amplitude (binary bit pair 1 1) or a plus ⅓ amplitude (binary bit pair 1 0). In a similar manner, the negative polarities have either a −1 amplitude (binary bit pair 0 1) or a −⅓ amplitude (binary bit pair 0 0). For each bit pair, the left-hand bit is referred to as a "polarity bit" with a 1 being a positive polarity and the 0 being a negative polarity. The right-hand bit of each bit pair is referred to as the "amplitude bit" with a 1 being a full value amplitude, i.e., a 1 unit, and the 0 being a lesser amplitude, i.e., ⅓ unit.

For a modem suitable for handling 9,600 bits per second (BPS), data is received at the input clock rate of 9,600 BPS as shown by clock waveform 110 in FIG. 1A. The data is grouped into pairs of bits. The pairs of bits thus appear at a rate of 4,800 BPS as shown by waveform 112. A typical data signal will be a sequence of random bits. It may have a repeated sequence of identical bit pairs, or the bit pairs may alternate such that the data signal swings from level to level. Such data signals thus have a possible frequency range between 0 and 2,400 Hz. A representative data signal 114, FIG. 1A, depicts a data pattern of 1 1, 0 1, 0 1, and 1 0. A data pattern of 1 1, 0 1, 1 1, 0 1 is shown by the solid and dashed portions of wave 114. Such a pattern creates a 2,400-Hz. waveform which is referred to as an "in-phase signal." It is in-phase since its zero crossings appear simultaneously with each clock signal of the 4,800-BPS waveform 112. A 2,400-Hz. sinewave 115 is phase shifted by +90° relative to the data waveform 114 in order to define sample times which are precisely in the middle of the groupings of the bit pairs. The reason for shifting the data signal by +90° will be made more clear hereinafter. Basically, however, when compensated for at the receiver in accordance with the principles of this invention, a precise sampling interval is obtained for decoding. Such a receiver sample time is shown by waveform 116, FIG. 1A. The 2,400 Hz. with a +90° phase shift is referred to as a "first pilot tone." FIG. 1A also shows a second pilot tone having a frequency of 2,900 Hz. and shifted +90°. FIG. 1A depicts an idealized case for demodulation wherein a pilot tone of 2,900 Hz. in the receiver has a proper phase and frequency correlation with a pilot tone of 2,900 Hz. +90°. Application of such tones to a balanced demodulator yields a discontinuous alternating current output signal 122 having no DC component. Thus, the shaded area under curve 122 above and below the reference line is equal.

Although an idealized frequency and phase correlation is obviously not possible, this invention approaches such an idealized situation quickly and accurately. It is also important that the amplitude of the received signal be compensated for in a precise manner, and this invention also compensates for the amplitude variations. Thus, all three of the noise factors discussed above are quickly and reliably obviated by my invention.

Turning now to FIG. 1, a transmitter 10 is shown connected via a telephone line and transformer 45 to a receiver 50. Transmitter 10 includes an encoder 12 which receives bits of data in serial fashion at a high rate such as 9,600 BPS chosen as illustrative only for explaining the principles of this invention. A 9,600-c.p.s. clock signal 110, FIG. 1A is also applied to an encoder 12. Encoder 12 groups two serial bits into a pair and converts them into parallel signals for modulator 14. Encoder 12 also developes a 2,400-Hz., +90° signal which is applied to a summing amplifier 16. Summing amplifier 16 also receives the modulated data output from modulator 14.

Figure 2:
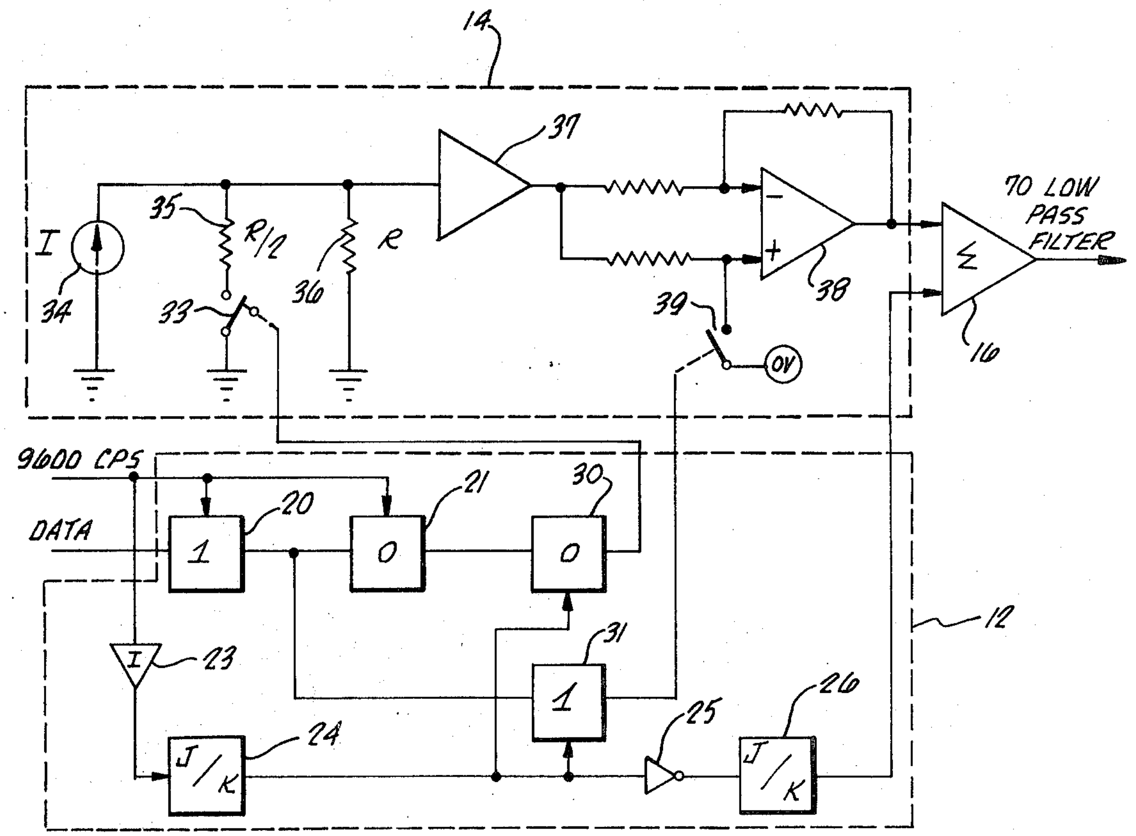
FIG. 2 is a combined block diagram and circuit schematic of the encoder and modulator employed at a modem transmitter in accordance with this invention.

In FIG. 2 the encoder 12 and the modulator 14 are shown in more detail. Encoder 12 includes a pair of series-connected binary register stages 20 and 21 which are clocked by the 9,600-c.p.s. signal to store data therein. As a typical example the first bit pair comprises a 1 and a 0 which are clocked into binary stages 20 and 21 respectively. The 9,600-c.p.s. signal is inverted by inverter 23 and applied to a JK flip-flop 24 which emits a 4,800-c.p.s. signal that is out-of-phase with the 9,600-c.p.s. signal as shown by comparison of waveforms 110 and 112, FIG. 1A.

A second pair of binary register stages 30 and 31 are clocked by the 4,800-c.p.s. signal 112 that is emitted from the JK flip-flop 24. Stage 30 stores the amplitude bit which, in this case, is 0. Stage 31 stores the polarity bit which, in this case, is a 1. The binary value stored in binary register stage 30 either opens or closes switch 33 which may be any appropriate solid-state switching device. A current source 34 is connected to resistor 35 which resistor is either open circuited or grounded depending upon the condition of switch 33. A second resistor 36, having a resistor value twice that of resistor 35, continually provides a path to ground from current source 34. Opening and closing of switch 33 alternately parallels resistors 35 and 36 to provide a signal output from amplifier 37 which is respectively ⅓ unit in magnitude or a full unit in magnitude. Output signals from amplifier 37 are applied to an operational amplifier 38. Amplifier 38 polarizes the output from amplifier 37 to either a positive or a negative polarity depending upon the value of the binary bit stored in stage 31. Binary bits stored in stage 31 again opens or closes switch 39 to obtain the polarity functions.

The output from operational amplifier 38 is applied to the summation amplifier 16. Amplifier 16 also receives an additional signal which is a first pilot tone, or 2,400-Hz. signal shifted by +90°. This pilot tone is derived from encoder 12 by another inverter and JK flip-flop combination 25–26, which combination is connected to the output of JK flip-flop 24.

Reference to FIG. 1 shows that the output from amplifier 16 is applied to a low-pass filter 18. Low-pass filter 18 removes high-frequency components from the square waves applied to it, and thus a smoothed analog signal is obtained. Low-pass filter 18 is connected to a balanced modulator 40. In balanced modulator 40 the filtered data signal is modulated by a 2,900-Hz. modulating signal. Mixing the data signal in this manner translates the data frequency (0 to 2,400 Hz. as described earlier) to a line signal which is in the frequency range of 500 Hz. to 2,900 Hz. Output signals from summing amplifier 42 are again low-pass filtered, and then amplified by line driver 44. This signal is hereafter called a line signal since it is applied to a telephone line and telephone transformers shown simply as 45 in FIG. 1. This 2,900 Hz. is shifted by a positive 90° phase shift amount as depicted by waveform 118 in FIG. 1A to create a second pilot tone. The second pilot tone is applied to a summing amplifier 42 which amplifier also receives the output from the balanced modulator 40.

Essentially, the inverse of the transmit operation is required to demodulate the data-containing line signal at the receiver. As explained earlier a demodulating pilot tone of precisely 2,900 Hz. would cancel out completely any DC noise signal. The idealized situation is, of course, not possible because the line signals are subjected to the various randomly occurring noise factors discussed hereinbefore. Such noise factors distort the line signal pilot tone 118 relative to a precise 2,900-Hz. signal at the receiver. A typical phase shift is shown simply in FIG. 1A by the dashed waveform 122A as one form of such distortion. A shift as shown results in unequal amounts of the alternating current signal 122A from the receiver demodulator, as shown by the dashed waveform 122A. Such a phase shift introduces a net positive DC noise at the receiver. This type of DC noise unless compensated for, will mask the amplitude levels of the data signal to be decoded. Whereas, the explanation to this point has assumed a phase shift on the pilot tone, it should be understood that frequency translations, unless compensated for, will also adversely affect the data-decoding process. For example, if the input pilot tone is translated up to 2,901 Hz. by telephone line and circuitry disturbances, then the demodulating pilot tone must also follow that translation or noise will again disrupt the data-decoding operation. Of course, variations in amplitude must also be compensated for or the level detectors will not adequately distinguish between the ⅓-unit and the one-unit amplitudes of the data format. Further, an accurate timing reference is essential in order to obtain the sample for data decoding at just the proper instant.

Having this background understanding of frequency, phase timing, and amplitude variations in mind it is now proper to refer to the detail operation of receiver 50, FIG. 1. Signals from the telephone line and transformer 45 are received by a preamp circuit 51 which is connected to a low-pass filter 52 which is, in turn, connected to an automatic gain control amplifier 53. Output signals from the automatic gain amplifier 53 are supplied to a balanced demodulator 60 which employs a 2,900-Hz. demodulating pilot tone as supplied by the frequency/phase compensator circuit 65. The compensator circuit 65 samples the output of modulator 60 and in accordance with the principles of this invention correlates it with the frequency and phase variations appearing in the transmitted pilot tone because of line or other disturbances. The output from demodulator 60 is translated down to the line frequency between 0 and 2,400 Hz. This translated signal is applied to a low-pass filter 61.

The first 2,400-Hz., +90° pilot tone that is present in the data signal output from filter 61 is derived by a 2,400-Hz. resonant tuned circuit 46. The tuned circuit output is applied to a pair of balanced demodulators 47 and 48. Tuned circuit 46 is not absolutely necessary and may be omitted. The balanced demodulator 60, when correction is proper, removes the 2,900-Hz. signal entirely and thus only the 2,400-Hz. signal is present. This 2,400-Hz. signal may be applied directly to a pair of balanced demodulators 47 and 48 if so desired without departing from the operational principles of this invention.

I have discovered in my reduction to practice of this invention that frequency translation of the 500 Hz. to 2,900 Hz. line signal is always constant across the bandwidth. For example, 1-cycle-per-second frequency translation changes the line signal from 500 Hz. through 2,900 Hz. to 501 Hz. to 2,901 Hz. The bandwidth thus remains 2,400 Hz. in spite of frequency translation. There is no requirement that the 2,400-Hz. signal be compensated for as to frequency since such frequency translation does not exist for the 2,400-Hz. signal. Phase distortion, however, does affect the 2,400-Hz. signal and it must be compensated for. Accordingly, phase compensator circuit 49 is connected to the output of balanced demodulator 47. Compensator 49 supplies a demodulating tone back to balanced demodulator 47. Correlation of the demodulating tone with the +90° offset of the first pilot tone again yields no DC noise level.

Amplifier 53 has an automatic gain control terminal 55 which receives the output from an amplitude stabilizer circuit 56. Amplitude stabilizer 56 is simply an averaging network of the type well known to the prior art. The stabilized data signal is applied at an analog-digital converter 62. The sample times for obtaining data levels are precisely controlled to locations such as shown by signal 116, FIG. 1A. This timing waveform is emitted by phase shifter 41 connected to receive the correlated 2,400-Hz. signal from compensator 49. The digital output from converter 62 is applied to a time domain equalizer 63. Time domain equalizers are well known in the prior art. Such equalizers serve to reorder the digital signals applied to the input and provide further compensation for noise disturbances. The output of equalizer 63 is applied to a parallel converter 64 which changes the parallel bit pairs back to serial order for delivery to utilization circuitry.

The general principles for phase correction will now be described with reference to FIG. 3, which is the basic block diagram of the compensator 65 of FIG. 1. Both compensator 65 for the 2,900-Hz. signal, and compensator 49 for the 2,400-Hz. signal, operate in the same manner and, thus, only compensator 65 will be depicted and described in detail.

Figure 3:
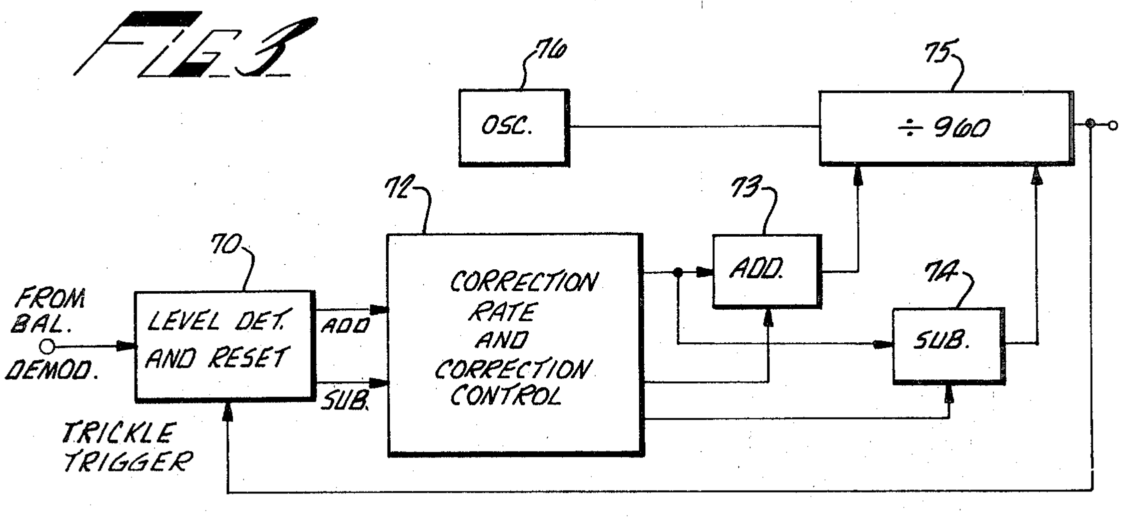
FIG. 3 is a block diagram depicting, in greater detail, the frequency and phase compensator of FIG. 1.

A signal output from the balanced demodulator 60 is applied to a level detector and automatic reset circuit 70, FIG. 3. Circuit 70 will be described in more detail hereinafter with reference to FIG. 4. Basically, however, it accumulates error signals in the form of noise transients until a predetermined noise error amplitude of either given polarity is accumulated. At that point the threshold level is exceeded, its polarity is determined, and an appropriate command is emitted to correction control 72. Digressing for a moment, it was described earlier with reference to FIG. 1A that a phase error in one direction results in positive DC noise errors; whereas, a phase variation in the other direction results in negative DC noise errors. Such errors may be compensated for by adding or subtracting phase and/or frequency. Accordingly, detector 70 emits either an add or subtract command. Correction control 72 temporarily stores the sense of correction required. Correction control 72 also determines the interval between successive add or successive subtract commands from level detector circuit 70. Several rapid and successive given commands, such as three add commands, for example, indicates that a high rate of correction is required. The control circuit 72 thus emits to the appropriate add (or subtract) logic gates 73 and 74, respectively, a large number of count pulses. Control 72 is also adapted to emit a lower rate of count pulses when a slower rate of correction is required. The add and subtract logic circuitry 73 and 74 applies the count pulses to vary the phase or frequency output signal from divider 75.

Divider 75 receives a stable high-frequency output from oscillator source 76. Oscillator 76 may have any suitable multiple of the desired output frequency from divider 75. In the case shown for FIG. 3 we have found added advantages by utilizing an oscillator which has a frequency 960 times the desired 2,900-Hz. output. Accordingly, the divider circuit 75 is adapted with a suitable number of stages to ultimately divide by 960 so that it will yield at its output stage a correlated, or in-phase, 2,900-Hz. square wave. This correlated demodulating tone is applied to balance demodulator 60 of FIG. 1. It is also fed back to circuit 70 to serve as a trickle trigger command. This trickle trigger command serves to positively initiate the level detect and resulting automatic reset for circuit 70 even in those instances wherein the noise errors approach the threshold with very small changes. Such changes may cause the circuit 70 to hang up without the trigger command, as will be more fully described hereinafter with reference to FIG. 4.

Figure 4:
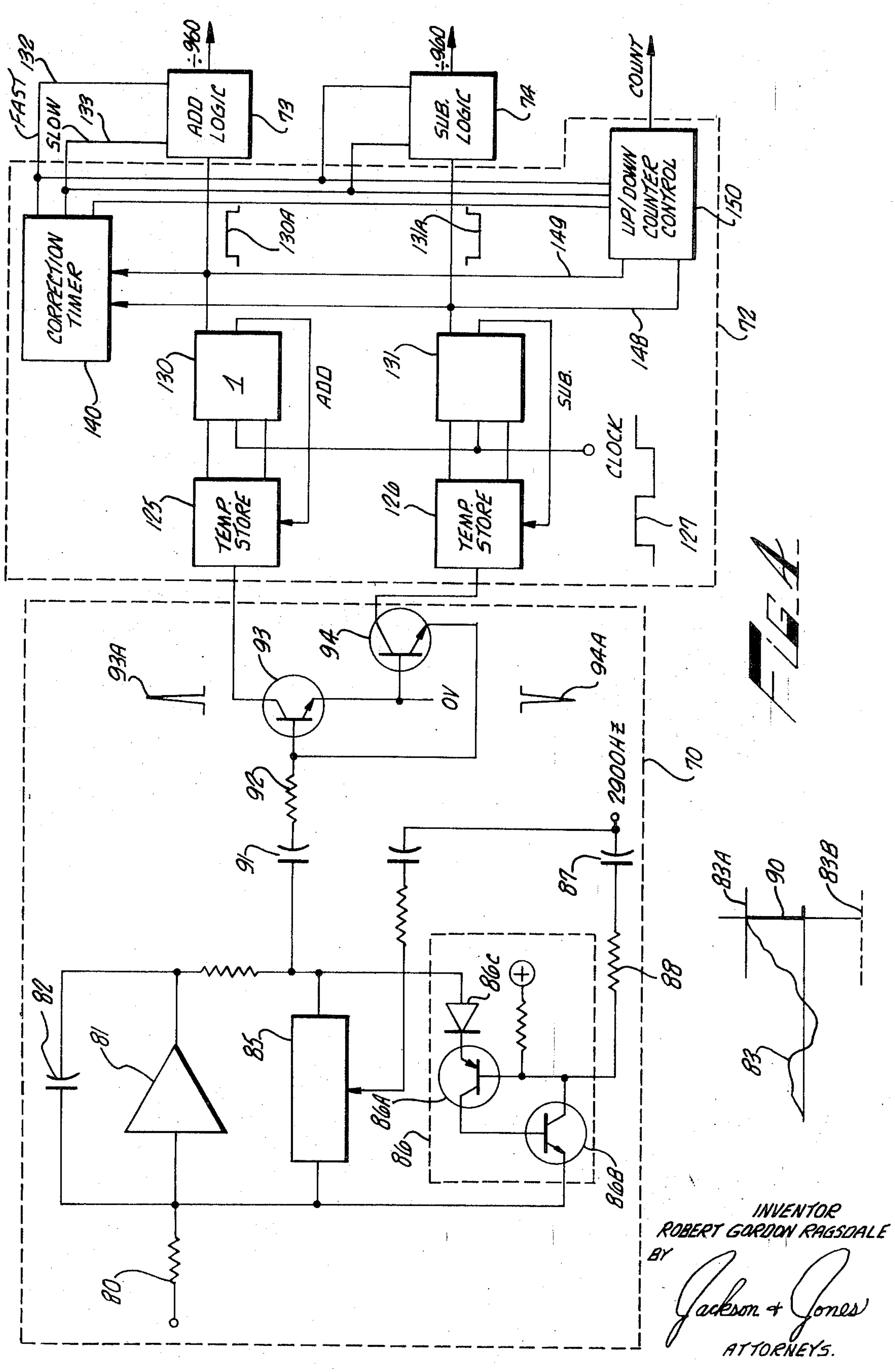
FIG. 4 is a combined circuit schematic and block diagram showing additional circuit details of FIG. 3.

In FIG. 4 the circuit details of the level detector and automatic reset circuit 70 are disclosed. The 2,900-Hz. demodulating tone from divider 75 is applied to demodulator 60 to initiate signal correlation. Since the two tones are not correlated, DC noise signals are applied through resistor 80 to an operational amplifier 81. A capacitor 82 is connected across operational amplifier 81 in order to store and accumulate the errors representative of say a phase difference between the pilot tone and demodulating tone. Waveform 83 below detector 70, FIG. 4, represents a typical accumulation of noise signals which will be stored in capacitor 82. As shown, the noise signals go positive and negative until a positive or negative charge on capacitor 82 reaches reference level 83A or 83B. A pair of threshold devices 85 and 86 form a parallel ladder circuit with amplifier 81 and charge storage capacitor 82. Gate 86 shows the typical threshold circuitry for responding to a predetermined threshold level 83A of positive polarity. Gate 85 responds to a predetermined level 83B of negative polarity. The details of gate 85 are identical to that of gate 86 except for opposite polarity sources and transistor types.

Assume that a threshold level such as 83A of approximately positive 6 volts is stored in capacitor 82. In order to assure breakdown, a small trigger current is applied from the 2,900-Hz. signal through the capacitor resistor combination 87, 88 as an overriding trickle trigger current for the base of transistor 86C. This trigger current is sufficient to assure the initiation of conduction in transistor 86A when the threshold potential 83A is achieved. The positive potential stored in capacitor 82 thus exceeds the back-bias condition of transistors 86A and 86B, and the transistors conduct current through diode 86C.

As just described, gates 85 and 86 when their threshold is exceeded serve to shunt storage capacitor 82 thus producing an abrupt voltage step 90 shown on the waveform 83. This voltage step 90 is an input signal to the differentiator circuit comprised of capacitor 91 and resistor 92. The differentiator output is connected to the base of a pair of steering transistors 93 and 94. These steering transistors 93, 94 are appropriately biased to transfer the sharp differentiated spiked pulses from the differentiator circuit to either one of a pair of temporary storage devices 125 and 126. For the representative circuitry shown, the positive differentiated pulse 93A is transferred to a temporary storage device 125, whereas negative differentiated pulse 94A is transferred to the temporary storage device 126.

Associated with temporary storage 125 is a clocked binary stage 130. The temporary storage device 125 and stage 130 constitute an add command generator. On the other hand, another clocked binary stage 131 is associated with temporary storage device 126. These latter two devices constitute the subtract command generator. The clock rate for stages 130 and 131 may be, for example, a 5,800-Hz. square wave 127, FIG. 4. Each stage includes a reset lead to reset their associated temporary storage device at clock time. Also at clock time the presence of a signal in the temporary storage device is transferred into the clocked stage to derive either an add or subtract command. An add or subtract command, once stored in stages 130 or 131, persists for the clock duration 127 as represented by output signals 130A and 131A, respectively, depicting an add or subtract command.

Correction timer 140 monitors the output signals from the add and subtract command stages 130 and 131. If several successive add pulses occur within a short duration, the correction timer is adapted to apply, via lead 132, during the time duration 130A several high-frequency count pulses to add logic 73. To provide a fast correction, as a typical example, 16 pulses are applied through add logic 73 to appropriate add gates of divide 75, FIG. 3. Several such fast corrections may be necessary to advance the output phase from divider 75 into correlation with the received pilot tone. As the high-speed correction takes place, the DC error will drop and, thus, the time between appearances of the successive add commands will increase. As these times increase, the correction timer 140 locks out the fast, or high-speed correction, and thereafter apply a slower correction, via lead 133. The slower correction reduces the number of count pulse to add logic gate 73 for application to divider 75.

We have discovered in a preferred embodiment of the invention that one particular timing format for correction timer 140 is highly advantageous. The appearance of three successive commands, for example, three add commands appearing within a time interval less than 44 msec. is interpreted as requiring correction timer 140 to assume the fast mode. Timer 140 thus supplies groups of 16 high-speed pulses during each add command interval thereafter. The fast mode changes to a slow mode if approximately 350 msec. elapse without any correction command appearing from stage 130 or 131. Thereafter, if approximately 1,500 msec. elapses without any correction, the timer 140 changes to an ultraslow mode. This ultraslow mode is applied to the up/down binary counter control circuit 150. Its primary function is to buffer the rate at which the up/down counter 180, FIG. 5, can be controlled, as will be more clearly described hereinafter with respect to FIG. 5.

Prior to describing a particular problem associated with frequency translation, one further factor with respect to the phase correction should be noted. The output signals from either the add logic 73 or the subtract logic 74 are applied directly through gates 165 and 170, FIG. 5, directly to the add and subtract circuits 75A and/or 75B of divider 75.

I have found in my reduction to practice of this invention that the phase corrections may properly be compensated for by directly applying the fast or slow count groups to divider 75. These corrections, when applied in the manner described, synchronize the 2,900-Hz. signal from divider 75 precisely 90° out of phase with the 2,900-Hz. pilot tone received over the line. With respect to frequency translation, however, a further factor must be taken into account. It is not uncommon in worse case conditions, to have frequency translation of several cycles per second over telephone line, telephone transformers and associated equipment. The output of oscillator 76 is fixed as is the number of stages in divider 75. Accordingly, if the circuit is to automatically advance the output of counter 75 by one full cycle, as a typical example, then it is necessary to continually add 960 counts per second to divider 75. The addition of 960 counts per second to divider 75 will result in a continuous output of 2,901 Hz. It is highly unlikely that even a major phase error will supply 960 counts per second to divider 75. Accordingly, a correction rate circuit 175 and a controlling up/down binary counter 180, FIG. 5, are provided.

Figure 5:
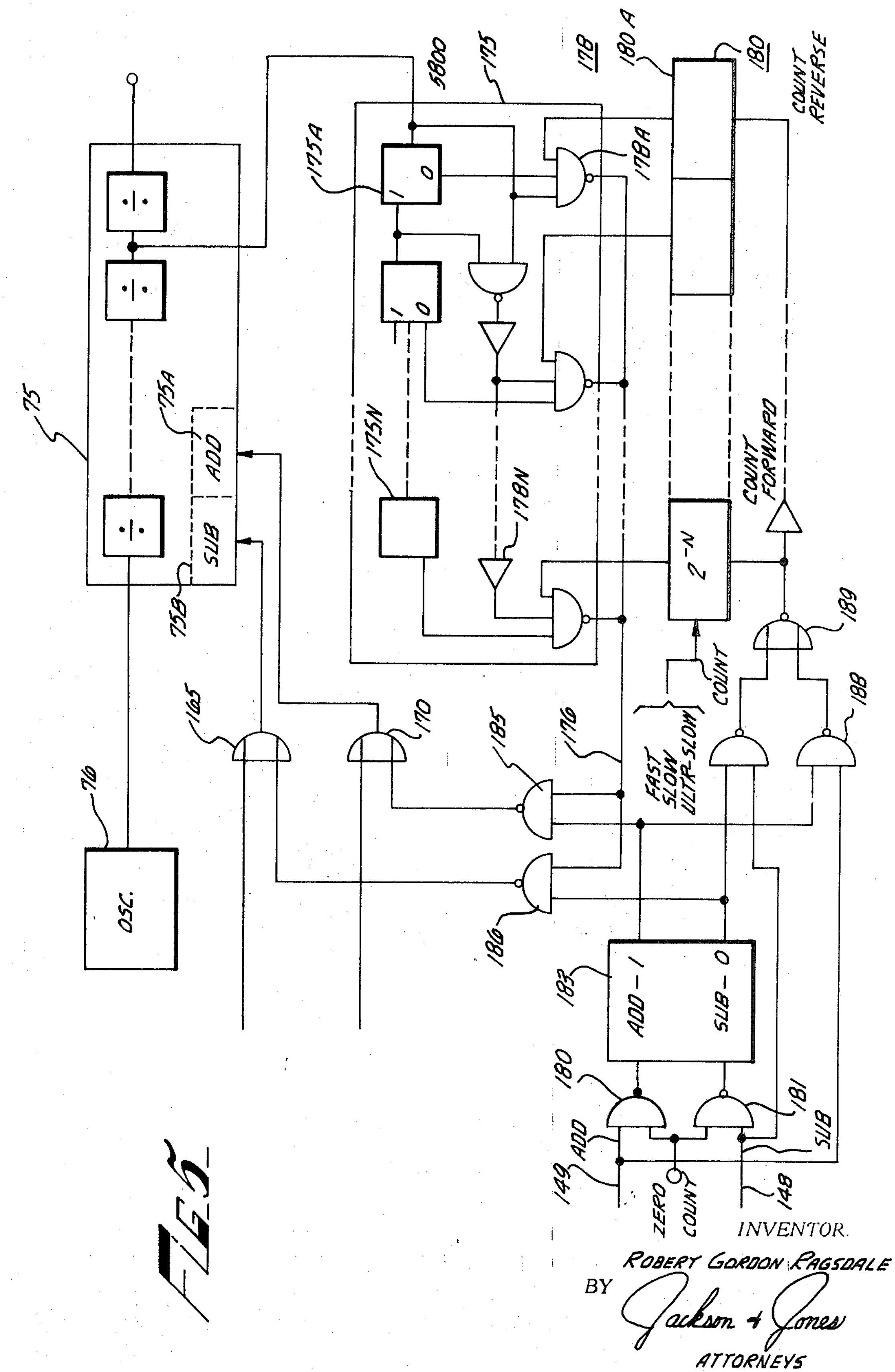
FIG. 5 is a block diagram which, when taken in conjunction with FIGS. 3 and 4, depict the operation of a frequency translation compensator shown in block form in FIG. 1.

Prior to describing the detail circuit operation of FIG. 5, a brief summary of its operation is in order.

Rate generator 175 receives the output from say the next to last stage of the divider 75. For examples used herein, the frequency of the signal applied to rate generator 175 would thus be 5,800 Hz. Rate generator 175 is another divider including a number of divider stages 175A through 175N. Signals from the divider stages are gated out to a rate generator output lead 176, from a selected gate as determined by the up/down counter 180. The up/down counter 180, in turn, is a binary counter with a number if stages assigned weighted fractional values in accordance with the binary format $2^{-n}$. As frequency translation is compensated for during a given time interval, one particular stage of binary counter 180 includes a binary 1 therein. This binary 1 is an enabling signal on only its associated gate of rate generator 175. An enabled gate continuously applies its stage's output signal to lead 176. From lead 176 such a signal is gated through the add or subtract circuitry 75A or 75B whichever is appropriate to adjust the frequency of divider 75 in the proper amount and direction.

As shown in FIG. 4, subtract commands are supplied on lead 148 to up/down counter control 150, and add commands are supplied on lead 149. These leads 148 and 149 are repeated in FIG. 5. At one given clock interval either an add command, a subtract command or neither appears on leads 148 or 149. For purposes of explanation assume that up/down counter 180 is reset and contains all zeros. This zero command condition is applied as a true input signal to the gates 180 and 181, which gates are input gates for a steering flip-flop 183.

Assume that another true or add command is applied on lead 149 to nand gate 180. Gate 180 responds to the pair of true inputs by emitting a proper polarity output so as to store a true or add command in steering flip-flop 183. Flip-flop 183 will, in turn, apply a true or enabling signal on one input of nand gates 185 and 188. This one true input condition on nand gate 185 is not matched by a true condition on the other input lead connected to rate generator line 176 because the all zero condition in up/down counter 180 disables all output gates 178 of generator 175. At the next add time, however, the true input applied to NAND-gate 188 is matched by another true input from the add command being present on lead 149.

Accordingly, gate 188 is satisfied and nor gate 189 passes a count forward signal into up/down counter 180. A fast, slow, or ultraslow signal is applied to the count lead of up/down counter 180 by the correction timer 140 of FIG. 4. The number of counts inserted into up/down counter 180 thus determines the binary number stored therein.

In the example just described, the count forward logic of up/down counter 180 is enabled and thus the all-zero condition of the counter is changed to a binary number which is stored therein. Assume that the binary number is such that stage 180A is true. This true condition will be applied to NAND-gate 178A. Gate 178A is associated with the first divider state 175A of the rate generator. Stage 175A receives at its input a 5,800Hz. signal. This 5,800-Hz. input is divided in half by stage 175A. Gate 178A thus emits, on rate generator lead 176, a 2,900-Hz. signal. This 2,900-Hz. signal is gated through NAND-gate 185 and OR-gate 170 to the add logic 75A of divider 75. This operation thus compensates for slightly over 3 cycles per second of frequency translation as representative of an extreme distortion situation. A reverse direction condition occurs alternately with a forward count once the frequency is locked up at the right amount. Thus, up/down counter 180 stores the proper binary count to hold the frequency in phase with the line frequency in a simple and reliable manner.

Once the frequency compensation is proper an ultraslow mode is assumed by correction timer 140. The ultraslow mode in essence leave the up/down counter 180 in its assumed count condition unless several consecutive add or several consecutive subtract commands are suddenly received.

Whereas, the compensation is phase variation and frequency translation has been described separately it should be understood that both compensations occur simultaneously. However, once the frequency translation is proper, the phase compensation may operate independently through the add/subtract logic 73–74, FIG. 4, and OR-gates 165 and 170, FIG. 5 as described earlier.

It is to be understood that the foregoing features and principles of this invention are merely descriptive, and that many departures and variations thereof are possible by those skilled in the art, without departing from the spirit and scope of this invention.

What is claimed is:

1. A data modem for transmitting and receiving data signals wherein the data intelligence is identified by predetermined signal amplitudes, said data modem adapted for connection to a communication line having the characteristic that phase shift and/or frequency translations randomly introduce DC noise into such data signals, which noise tends to mask the data-identifying amplitudes, said modem comprising:

a pilot tone generator at said transmitter means for adding from said generator to said data signals a first pilot tone having a predetermined phase and frequency to form a composite signal for transmission over said communication line;

a first variable signal generating means at said receiver for generating and emitting therefrom a second pilot tone;

a demodulator connectable to receive said second pilot tone and said composite signal and responsive thereto for emitting the data containing signal substantially free of any DC noise components when the second pilot tone is correlated in frequency and phase to cancel out the first pilot tone and for emitting DC noise signals which are proportional to phase shift and/or frequency translations introduced into the composite signal by said communication line when the second pilot tone and the first pilot tone are noncorrelated in frequency and phase;

means for storing the DC noise signals from said demodulating means;

means connected to said storage means for emitting command signals in accordance with the DC noise signals stored in said storage means; and means applying said command signals to said variable signal generating means for adjusting the phase and frequency of the second pilot tone therefrom in amounts to cancel out said DC noise signals.

2. A data modem in accordance with claim 1 wherein said variable signal generating means comprises:

an oscillator having an output which is N times the pilot tone frequency; and a divide-by-N counter connected to said oscillator, said counter emitting a variable phase and/or frequency signal in response to said command signals.

3. A data modem in accordance with claim 2 wherein said generating means further comprises:

a source of count pulses for said counter;

means for adding and/or subtracting pulses from said count source to said counter; and means for applying said command signals as enabling signals for said adding and/or subtracting means.

4. A data modem in accordance with claim 2 wherein said command signal emitting means comprises:

an add circuit connected to said counter for adding count pulses to said counter for a DC noise signal of one polarity; and a subtract circuit connected to said counter for subtracting count pulses from said counter for DC noise signals of an opposite polarity.

5. A data modem in accordance with claim 4 and further comprising:

a source of count pulses having a fast mode for emitting to said add and/or said subtract circuits a plurality of high-speed count pulses, and a slow mode for emitting thereto a plurality of slower speed count pulses;

a timer control connected to said storage means and responsive to the rate of appearance of DC noise signals of a given polarity and magnitude for emitting a fast or slow mode command; and means applying said fast or slow mode commands to said add and/or subtract circuits.

6. A data modem in accordance with claim 4 wherein said DC noise signal storage means comprises:

a storage element for storing a net voltage in accordance with said noise signals applied thereto;

first and second voltage breakdown devices connected in parallel with each other and in parallel across said storage element, said devices being electrically poled for breakdown at threshold levels of fixed but opposite voltage amounts;

an add command circuit connected to and responsive to breakdown of one of said storage devices for enabling said add circuit; and a subtract command circuit connected to and responsive to breakdown of the other of said storage devices for enabling said subtract circuit.

7. A data modem in accordance with claim 6 and further comprising:

a source of trigger current; and means connecting said source to said breakdown devices to assure breakdown of said devices at said threshold levels.

8. A data modem in accordance with claim 7 wherein:

said source of trigger current comprises an output signal derived from the output signal from said counter.

9. A data modem in accordance with claim 2 and further comprising:

a second signal-generating means having a plurality of continuously emitted count pulses of different repetition rates; and means for applying a selected rate from said second generating means to said divide-by-N counter so as to continuously compensate for frequency translations introduced into said composite signal.

10. A data modem for transmitting binary data over telephone lines which interconnect a modem receiver and a modem transmitter, said data modem transmitter comprising:

means for grouping serial data into bit pairs, one bit of which is assigned an amplitude value from a pair of amplitudes and the other bit of which is assigned a polarity from a pair of polarities;

first pilot tone generator means;

modulating means at the transmitter for modulating the data with the first pilot tone to a line signal which includes said first pilot tone;

said modem receiver comprising:

means for receiving line signals which may be degraded by noise factors including frequency translation and phase variation;

an oscillator having an output which is N times the first pilot tone frequency;

a divide-by-N frequency generator at the receiver connected to said oscillator for emitting a second demodulating pilot tone, said generator being variable in response to command signals;

a balanced demodulator receiving the line signal and said second pilot tone as a demodulating tone for emitting an alternating current signal substantially free of any DC noise when the demodulating tone is correlated in frequency and phase to cancel out the first pilot tone;

storage means connected to the demodulator output for deriving a DC error signal related to phase and/or frequency differences between the first pilot tone and the demodulating tone; and a command circuit connected to the storage means and responsive to the DC noise signals stored therein for emitting commands to vary the output frequency of said generator.

11. A data receiver for receiving data signals wherein the data intelligence is identified by predetermined signal amplitudes at receiver clock times in composite signal form with a first pilot tone, said receiver adapted to receive the composite signal over a communication line having the characteristic that DC noise tending to mask the data-identifying amplitudes is introduced by phase shift and/or frequency translations in said composite signal, said receiver comprising:

a double-balanced demodulator connectable to receive said composite signal and responsive to a demodulating pilot tone generated at said receiver for emitting the data-containing signal substantially free of any DC noise components when the demodulating pilot tone is correlated in frequency and phase to cancel out the first pilot tone and for emitting DC noise signals which are proportional to phase shift and/or frequency translations introduced into the composite signal by said communication line when the second pilot tone and the first pilot tone are noncorrelated in frequency and phase;

storage means connected to said demodulator for storing said DC noise signals;

means connected to said storage means for emitting digital command signals in accordance with the polarity and the magnitude of DC noise signals stored therein;

a digital divider circuit responsive to said digital commands for emitting a variable phase and/or variable frequency demodulating pilot tone signal;

command signal applying means connected between said divider and said storage means; and means applying the divider circuit output signal as a variable phase and/or variable frequency demodulating pilot tone signal to said demodulating means.

* * * * *